United States Patent
Huang

(10) Patent No.: US 12,432,789 B2
(45) Date of Patent: Sep. 30, 2025

(54) PHYSICAL LAYER COLLISION AVOIDANCE (PLCA) DEVICE AND METHOD FOR AUTOMATICALLY DETERMINING NODE IDENTITY FOR PLCA DEVICE

(71) Applicant: IC Plus Corp., Hsin-Chu (TW)

(72) Inventor: Chun-Ying Huang, Hsin-Chu (TW)

(73) Assignee: IC PLUS CORP., Hsin-Chu (TW)

( * ) Notice: Subject to any disclaimer, the term of this patent is extended or adjusted under 35 U.S.C. 154(b) by 454 days.

(21) Appl. No.: 18/180,141

(22) Filed: Mar. 8, 2023

(65) Prior Publication Data
US 2024/0244674 A1  Jul. 18, 2024

(30) Foreign Application Priority Data
Jan. 13, 2023 (TW) .................................. 112101586

(51) Int. Cl.
*H04W 74/0833* (2024.01)
*H04W 56/00* (2009.01)

(52) U.S. Cl.
CPC ......... *H04W 74/085* (2013.01); *H04W 56/00* (2013.01)

(58) Field of Classification Search
CPC ............. H04W 74/085; H04W 56/00; H04L 12/40169; H04L 12/413; H04L 9/0869; H04L 63/08
See application file for complete search history.

(56) References Cited

U.S. PATENT DOCUMENTS 10,925,097 B2    2/2021  Beruto et al.
11,336,470 B2 *  5/2022  Kim .................. H04L 12/40039
(Continued)

FOREIGN PATENT DOCUMENTS

| EP | 3905603 | 11/2021 |
| TW | I769012 | 6/2022 |
| WO | 2022046962 | 3/2022 |

OTHER PUBLICATIONS

"Office Action of Japan Counterpart Application", issued on May 24, 2024, p. 1-p. 2.
(Continued)

*Primary Examiner* — Afshawn M Towfighi
(74) *Attorney, Agent, or Firm* — McClure, Qualey & Rodack, LLP

(57) ABSTRACT

A physical layer collision avoidance (PLCA) device and a method for automatically determining a node identity for the PLCA device are provided. The method includes: generating a random number as identification information of the PLCA device, wherein the PLCA device maintains an identification information table and a device count; receiving a first synchronization packet, wherein the first synchronization packet includes first identification information of a first PLCA device; determining a first comparison result between the identification information of the PLCA device and the first identification information of the first PLCA device; updating the identification information table and the device count based on the first comparison result; sending a synchronization packet corresponding to the PLCA device based on the first comparison result; and determining the node identity of the PLCA device in a PLCA network based on the identification information table.

20 Claims, 3 Drawing Sheets

(56) References Cited

U.S. PATENT DOCUMENTS

| | | | |
|---|---|---|---|
| 2012/0008627 A1 | 1/2012 | Chen et al. | |
| 2012/0271924 A1 | 10/2012 | Spitaels et al. | |
| 2019/0230705 A1* | 7/2019 | Beruto | H04J 3/0652 |
| 2019/0313446 A1* | 10/2019 | Kim | H04W 74/02 |
| 2023/0135690 A1* | 5/2023 | Beruto | H04L 43/062 |
| | | | 709/226 |
| 2024/0244674 A1* | 7/2024 | Huang | H04L 12/40169 |

OTHER PUBLICATIONS

"Search Report of Europe Counterpart Application", issued on Sep. 6, 2023, p. 1-p. 8.

Piergiorgio Beruto et al., "802.3cg draft 2.0 PLCA (Clause 148) Overview", IEEE 802.3 Plenary Meeting, San Diego (CA) 2018, Jul. 9, 2018, p. 1-p. 23.

"IEEE Std 802.3cg™-2019—IEEE Standard for Ethernet—Amendment 5: Physical Layers Specifications and Management Parameters for 10 Mb/s Operation and Associated Power Delivery over a Single Balanced Pair of Conductors", Feb. 5, 2020, p. 1-p. 256.

Piergiorgio Beruto, "Dynamic PLCA Node ID Assignment", IEEE 802.3da SPMD TF Plenary Meeting, Mar. 10, 2021, p. 1-p. 21.

"Office Action of Taiwan Counterpart Application", issued on Oct. 17, 2023, p. 1-p. 4.

* cited by examiner

PHYSICAL LAYER COLLISION AVOIDANCE (PLCA) DEVICE AND METHOD FOR AUTOMATICALLY DETERMINING NODE IDENTITY FOR PLCA DEVICE

CROSS-REFERENCE TO RELATED APPLICATION

This application claims the priority benefit of Taiwan application serial no. 112101586, filed on Jan. 13, 2023. The entirety of the above-mentioned patent application is hereby incorporated by reference herein and made a part of this specification.

BACKGROUND

Technical Field

The disclosure relates to a physical layer collision avoidance (PLCA) technology, and in particular to a PLCA device and a method for automatically determining a node identity for the PLCA device.

Description of Related Art

Although the PLCA defined in IEEE802.3cg may allow the multi-drop network to work efficiently, there is a problem that cannot be ignored in practical applications, that is, the user needs to set the node identity and the number of nodes before the PLCA mechanism is activated, otherwise the PLCA cannot work properly.

In order to solve the problem, some methods have been proposed. However, most of the methods have problems such as easily making the system unstable, and data packets cannot be sent or even discarded due to the back-off time being too long.

SUMMARY

The disclosure provides a physical layer collision avoidance device and a method for automatically determining a node identity for the physical layer collision avoidance device, which can be used to solve the above technical problems.

An embodiment of the disclosure provides a physical layer collision avoidance device, which includes a communication circuit and a controller. The communication circuit is used to receive a first synchronization packet. The first synchronization packet includes first identification information of a first physical layer collision avoidance device. The controller is coupled to the communication circuit and maintains an identification information table and a device count. The controller is configured to execute the following. A random number is generated as identification information of the physical layer collision avoidance device. A first comparison result between the identification information of the physical layer collision avoidance device and the first identification information of the first physical layer collision avoidance device is determined. The identification information table and the device count are updated based on the first comparison result. The communication circuit is controlled to send a synchronization packet corresponding to the physical layer collision avoidance device based on the first comparison result. A node identity for the physical layer collision avoidance device in a physical layer collision avoidance network is determined based on the identification information table.

An embodiment of the disclosure provides a method for automatically determining a node identity for a physical layer collision avoidance device, which is applicable to the physical layer collision avoidance device and includes the following steps. A random number is generated as identification information of the physical layer collision avoidance device. The physical layer collision avoidance device maintains an identification information table and a device count. A first synchronization packet is received. The first synchronization packet includes first identification information of a first physical layer collision avoidance device. A first comparison result between the identification information of the physical layer collision avoidance device and the first identification information of the first physical layer collision avoidance device is determined. The identification information table and the device count are updated based on the first comparison result. The communication circuit is controlled to send a synchronization packet corresponding to the physical layer collision avoidance device based on the first comparison result. The node identity for the physical layer collision avoidance device in a physical layer collision avoidance network is determined based on the identification information table.

DETAILED DESCRIPTION OF DISCLOSED EMBODIMENTS

Figure 1:
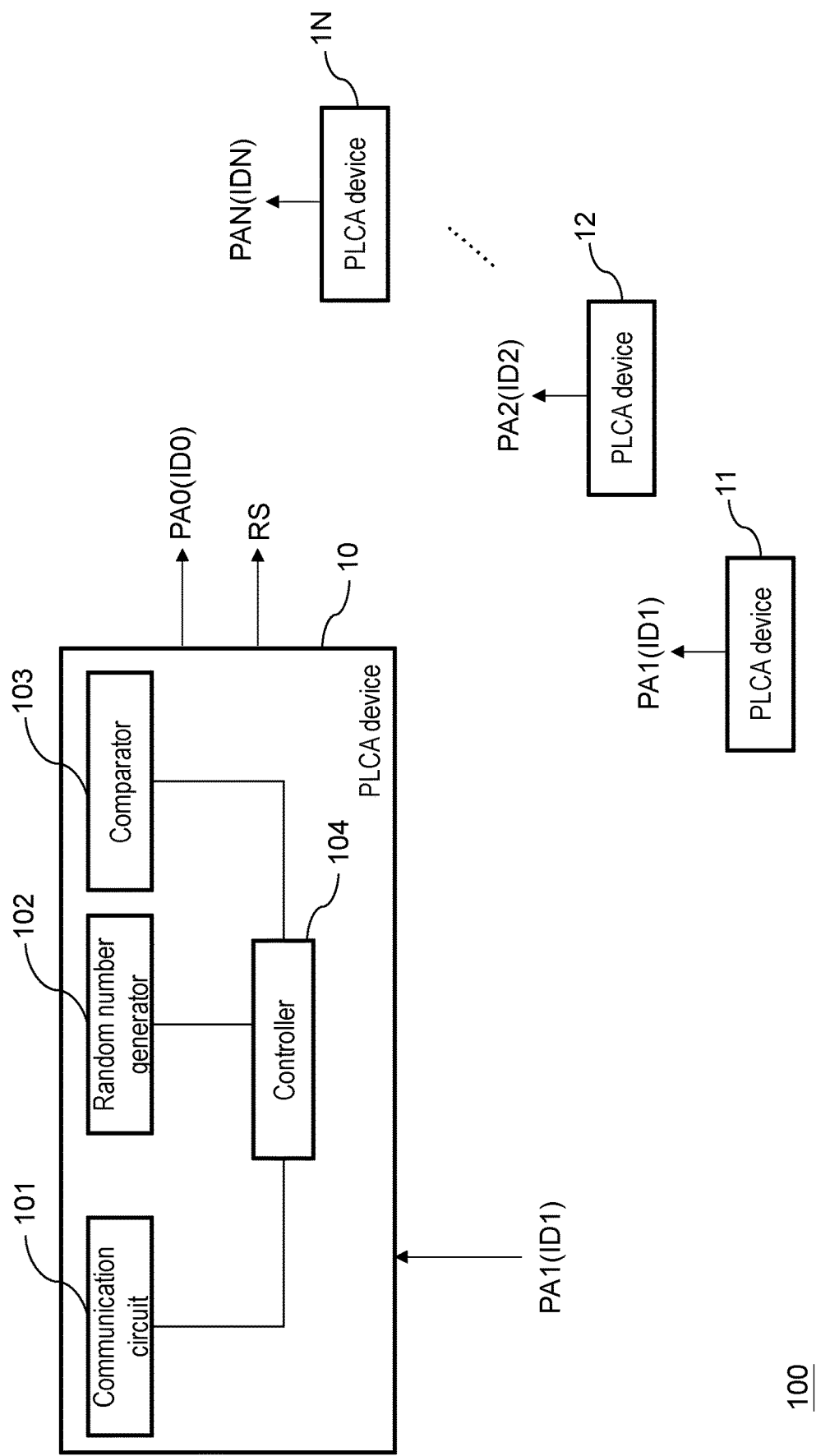
FIG. 1 is a schematic diagram of a physical layer collision avoidance (PLCA) network according to an embodiment of the disclosure.

Please refer to FIG. 1, which is a schematic diagram of a physical layer collision avoidance (PLCA) network according to an embodiment of the disclosure. In FIG. 1, a PLCA network 100 includes PLCA devices 10 to 1N, wherein the PLCA devices 10 to 1N may have the same or similar structures. Taking a PLCA device 10 as an example, the PLCA device 10 includes a communication circuit 101, a random number generator 102, a comparator 103, and a controller 104.

In an embodiment, the communication circuit 101 may be used, for example, to implement communication between the PLCA device 10 and other PLCA devices in the PLCA network 100, and the communication circuit 101 may be implemented as a communication module with a corresponding communication function due to a communication protocol used for packet exchange between the PLCA devices 10 to 1N.

In an embodiment, the PLCA devices 10 to 1N may, for example, use a carrier sense multiple access with collision detection (CSMA/CD) protocol for packet exchange. In this case, the communication circuit 101 may be implemented as a communication module with a CSMA/CD function, but not limited thereto.

In an embodiment, the random number generator 102 may be used, for example, to generate a random number as identification information ID0 of the PLCA device 10. In addition, the comparator 103 may be used, for example, to compare the identification information ID0 of the PLCA device 10 with identification information of other PLCA devices, but not limited thereto.

The controller 104 is coupled to the communication circuit 101, the random number generator 102, and the comparator 103, and may be a general purpose processor, a specific purpose processor, a traditional processor, a digital signal processor, multiple microprocessors, one or more microprocessors combined with digital signal processor cores, a microcontroller, an application specific integrated circuit (ASIC), a field programmable gate array (FPGA), any other types of integrated circuits, state machines, processors based on advanced RISC machines (ARM), and the like.

In an embodiment, the random number generator 102 and the comparator 103 may be controlled by the controller 104 to implement the above functions. In another embodiment, the random number generator 102 and the comparator 103 may also be implemented as modules built in the controller 104 to implement the above functions, but not limited thereto.

In FIG. 1, for the structures of the PLCA devices 11 to 1N, reference may be made to the relevant description of the PLCA device 10, which will not be repeated here.

In the embodiment of the disclosure, the controller 104 may access specific modules and program codes to implement a method for automatically determining a node identity for a PLCA device proposed by the disclosure, and the details of which are detailed below.

Figure 2:
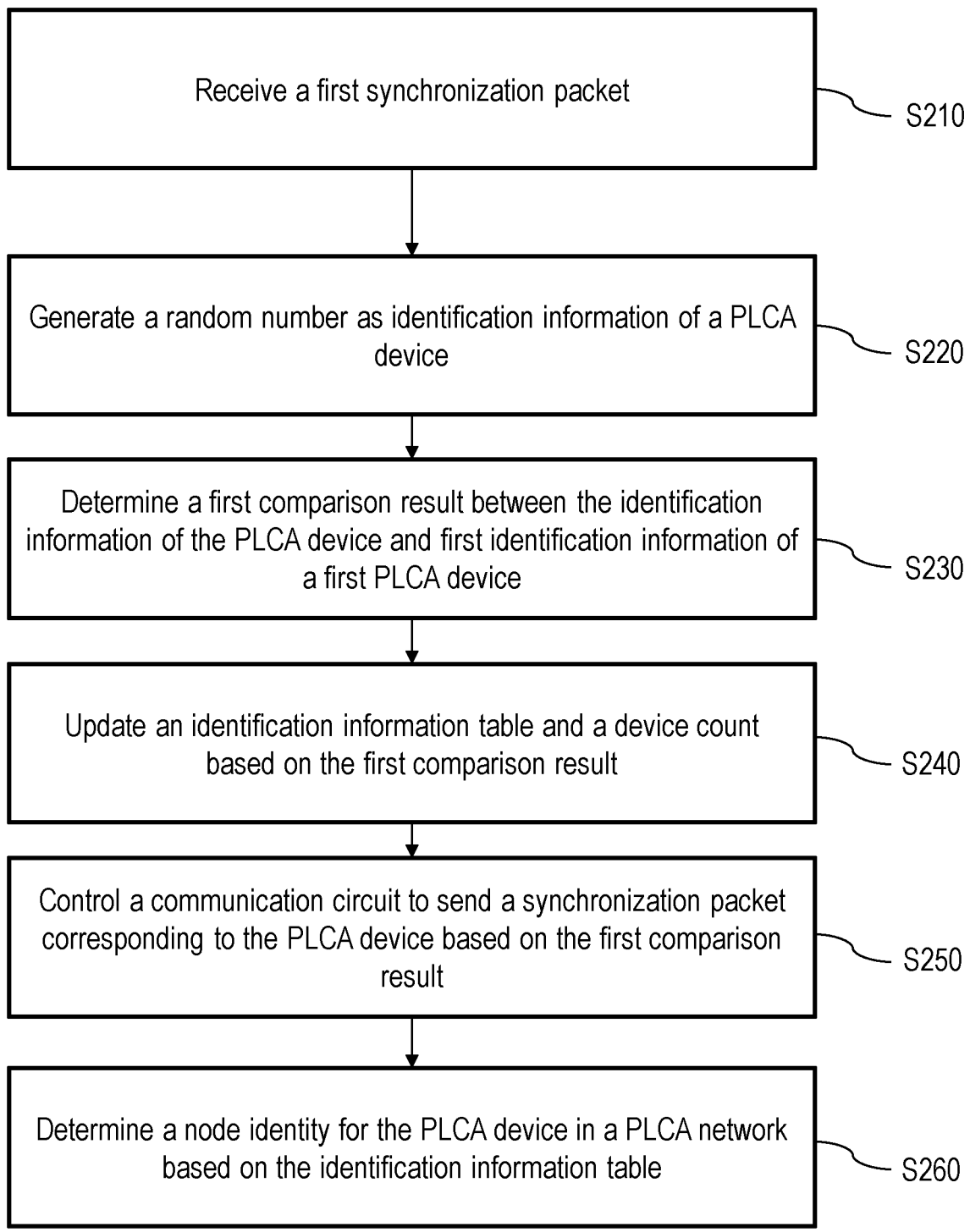
FIG. 2 is a flowchart of a method for automatically determining a node identity for a PLCA device according to an embodiment of the disclosure.

Please refer to FIG. 2, which is a flowchart of the method for automatically determining the node identity for the PLCA device according to an embodiment of the disclosure. The method of the embodiment may be executed by the PLCA device 10 of FIG. 1, and the details of each step of FIG. 2 will be described below in conjunction with the elements shown in FIG. 1.

Generally speaking, before the PLCA network 100 actually runs a PLCA mechanism, the embodiment of the disclosure may first automatically decide the node identity for the PLCA device 10 through the method shown in FIG. 2, and the other PLCA devices 11 to 1N may also decide their own node identities based on the same mechanism. After deciding the individual node identities of the PLCA devices 10 to 1N, the PLCA network 100 may then actually run the PLCA mechanism among the PLCA devices 10 to 1N accordingly.

First, in Step S210, the communication circuit 101 receives a first synchronization packet, wherein the first synchronization packet includes first identification information of a first PLCA device in the PLCA network 100. In different embodiments, the considered first PLCA device may be any one of the PLCA devices 11 to 1N.

For example, assuming that a first synchronization packet PA1 comes from the PLCA device 11, the PLCA device 11 may be understood as the considered first PLCA device. In this case, the first synchronization packet is, for example, the first synchronization packet PA1 from the PLCA device 11, and the first identification information therein is, for example, identification information ID1 of the PLCA device 11. For ease of description, it is assumed in FIG. 1 that the considered first PLCA device is the PLCA device 11, but it is only used as an example and not intended to limit possible implementations of the disclosure.

In an embodiment, the controller 104 maintains an identification information table and a device count, wherein the identification information table may, for example, record identification information in all synchronization packets received, and the device count is, for example, the total number of PLCA devices in the PLCA network 100 determined by the controller 104 based on all the synchronization packets received.

Based on this, in Step S220, the controller 104 generates the random number as the identification information ID0 of the PLCA device 10, and determines a first comparison result between the identification information ID0 of the PLCA device 10 and the first identification information (for example, the identification information ID1) of the first PLCA device in Step S230.

In an embodiment, the controller 104 may request the random number generator 102 to generate the random number as the identification information ID0, and request the comparator 103 to determine the first comparison result between the identification information ID0 and the first identification information (for example, the identification information ID1). In an embodiment, the first identification information (for example, the identification information ID1) is another random number generated by the random number generator in the first PLCA device (for example, the PLCA device 11).

In an embodiment, the first comparison result may, for example, specify that the identification information ID0 is the same as or different from the first identification information, but not limited thereto.

In Step S240, the controller 104 updates the identification information table and the device count based on the first comparison result. In Step S250, the controller 104 controls the communication circuit 101 to send a synchronization packet PA0 corresponding to the PLCA device 10 based on the first comparison result.

In an embodiment, in response to the first comparison result indicating that the identification information ID0 of the PLCA device 10 is different from the first identification information (for example, the identification information ID1) of the first PLCA device, it means that the PLCA device 10 and the first PLCA device do not use duplicate identification information. In this case, the controller 104 may determine whether the first identification information of the first PLCA device is recorded in the identification information table of the PLCA device 10.

In a first embodiment, in response to determining that the first identification information (for example, the identification information ID1) of the first PLCA device is not recorded in the identification information table of the PLCA device 10, it means that the first PLCA device is an unfamiliar PLCA device to the PLCA device 10 currently. In this case, the controller 104 updates the identification information table by adding the first identification information (for example, the identification information ID1) of the first PLCA device into the identification information table, and updates the device count by incrementing the device count.

Afterwards, the controller 104 controls the communication circuit 101 to send the synchronization packet PA0 corresponding to the PLCA device, wherein the synchronization packet PA0 includes the identification information ID0 of the PLCA device. In other words, when the PLCA device 10 receives a synchronization packet from the unfamiliar first PLCA device, the PLCA device 10 not only updates the identification information table and the device count accordingly, but also sends (for example, broadcasts) the synchronization packet PA0 including its own identification information ID0. In this case, if the first PLCA device receives the synchronization packet PA0, the first PLCA device may also determine whether to update the identification information table and the device count maintained by the first PLCA device according to the synchronization packet PA0 based on the mechanism taught above. Similarly, when other PLCA devices receive the first synchronization packet PA1 and/or the synchronization packet PA0, the other PLCA devices may also determine whether to update the identification information tables and the device counts maintained by themselves according to the first synchronization packet PA1 and/or the synchronization packet PA0.

In a second embodiment, in response to determining that the first identification information (for example, the identification information ID1) of the first PLCA device is recorded in the identification information table of the PLCA device 10, it means that the PLCA device 10 has previously received other synchronization packets from the first PLCA device, and has recorded the corresponding first identification information ID1 in the identification information table. In other words, the first PLCA device is not an unfamiliar PLCA device to the PLCA device 10 currently. In this case, the controller 104 may reset a packet detection time of the PLCA device without updating the identification information table and the device count.

In an embodiment, the packet detection time is, for example, a cumulative time when the PLCA device 10 has not received any synchronization packet from other PLCA devices. In the embodiment of the disclosure, if the cumulative packet detection time of the PLCA device 10 is not less than a preset time threshold (which may be determined by a designer according to requirements), it means that the information owned by each of the PLCA devices 10 to 1N (for example, the identification information tables and the device counts individually maintained by the PLCA devices 10 to 1N) are sufficient to be used to decide the node identity of each of the PLCA devices 10 to 1N, but not limited thereto.

In a third embodiment, in response to determining that the first comparison result indicates that the identification information ID0 of the PLCA device 10 is the same as the first identification information (for example, the identification information ID1) of the first PLCA device, it means that the PLCA device 10 and the first PLCA device use duplicate identification information (which may be referred to as an identification information conflict). In this case, the controller 104 updates the identification information table by resetting (for example, clearing) the identification information table, and updates the device count by resetting (for example, clearing) the device count.

Moreover, the controller 104 may (control the random number generator 102 to) generate another random number as the new identification information ID0 of the PLCA device, and control the communication circuit 101 to send a resynchronization packet RS and the synchronization packet PA0 corresponding to the PLCA device 10, wherein the synchronization packet PA0 includes the new identification information ID0 of the PLCA device 10. Since the new identification information ID0 at this time corresponds to another random number, the new identification information ID0 should be different from the (old) identification information ID0 included in the synchronization packet PA0 in the first embodiment.

In the third embodiment, the resynchronization packet RS is at least used to trigger the first PLCA device to reset the corresponding identification information table, reset the corresponding device count, regenerate the corresponding first identification information ID1, and send the first synchronization packet PA1 including the new first identification information ID1. Similarly, when other PLCA devices receive resynchronization packets, the other PLCA devices also reset the corresponding identification information tables, reset the corresponding device counts, regenerate the corresponding identification information, and send the synchronization packets including the newly generated identification information.

In other words, when the PLCA device 10 finds that the identification information conflict occurs, the PLCA device 10 may request the other PLCA devices 11 to 1N to reset the corresponding identification information tables, reset the corresponding device counts, regenerate the corresponding identification information, and send the synchronization packets including the newly generated identification information through the resynchronization packet RS.

For example, when the PLCA device 12 receives the resynchronization packet RS, the PLCA device 12 resets the identification information table, resets the device count, regenerates corresponding identification information ID2 (for example, a random number), and sends (for example, broadcasts) a synchronization packet PA2 including the newly generated identification information ID2. For another example, when the PLCA device 1N receives the resynchronization packet RS, the PLCA device 1N resets the identification information table, resets the device count, regenerates corresponding identification information IDN (for example, a random number), and sends (for example, broadcasts) a synchronization packet PAN including the newly generated identification information IDN.

In this case, the PLCA device 10 receives the corresponding synchronization packets PA1 to PAN from each of the PLCA devices 11 to 1N, and the synchronization packets PA1 to PAN individually includes the newly generated identification information of the corresponding PLCA device.

In the third embodiment, since the PLCA device 10 has reset (for example, cleared) the identification information table and reset (for example, cleared) the device count, the PLCA devices 11 to 1N are all unfamiliar to the PLCA device 10. Therefore, each time one of the synchronization packets PA1 to PAN is received, the PLCA device 10 records the identification information therein in the identification information table maintained by the PLCA device 10, and increments the device count.

In an embodiment, if the identification information ID0 to IDN are different from each other (that is, there is no identification information conflict), the PLCA device 10 will record the corresponding identification information ID1 to IDN in the identification information table maintained by the PLCA device 10 due to the synchronization packets PA1 to PAN, and gradually increment the device count.

As mentioned in the first embodiment, when the PLCA device 10 receives a synchronization packet from an unfamiliar PLCA device, in addition to updating the identification information table and the device count accordingly, the PLCA device 10 also sends the synchronization packet PA0. In other words, the PLCA device 10 may repeatedly send the synchronization packet PA0.

Based on similar principles, other PLCA devices may also repeatedly send corresponding synchronization packets, so that the PLCA device 10 repeatedly receives the same synchronization packets. In this case, the PLCA device 10 may update the packet detection time based on the teachings in the second embodiment, but not limited thereto.

In the scenario of FIG. 1, assuming that there is no identification information conflict, the identification information table maintained by the PLCA device 10 eventually records at least the identification information ID1 to IDN of the PLCA devices 11 to 1N, and the recorded device count is not less than the total number of the PLCA devices 11 to 1N.

In an embodiment, after resetting the identification information table and the device count, the controller 104 may also add the new identification information ID0 into the identification information table at any point in time, and increment the device count due to the PLCA device 10 itself. In this case, the identification information table maintained by the PLCA device 10 eventually records the identification information ID0 to IDN of the PLCA devices 10 to 1N, and the recorded device count is equal to the total number of the PLCA devices 10 to 1N, but not limited thereto.

Similarly, when there is no identification information conflict, the identification information tables individually maintained by the other PLCA devices 11 to 1N also eventually record the identification information ID0 to IDN of the PLCA devices 10 to 1N, and the recorded device counts are also equal to the total number of the PLCA devices 10 to 1N.

However, if any one of the PLCA devices 10 to 1N determines that there is an identification information conflict again, the mechanism of the third embodiment will be executed again until there is no identification information conflict, but not limited thereto.

In an embodiment, in response to determining that the synchronization packet PA0 experiences a packet collision (for example, the synchronization packet PA0 collides with other synchronization packets), the controller 104 may increment a cumulative number of collisions of the synchronization packet PA0, and re-send the synchronization packet PA0 after waiting for a back-off time, wherein the back-off time is associated with the cumulative number of collisions.

In an embodiment, the back-off time is characterized by $D*k$, where D is a specific bit time and k is $2^n-1$, where n is the cumulative number of collisions.

In an embodiment, the specific bit time may vary due to the communication environment considered. For example, in the 10BASE-T1S communication specification, the corresponding specific bit time may be selected as 192BT (bit time), which corresponds to 19.2 us. Furthermore, in different embodiments, when n is greater than a corresponding upper limit value (expressed as p), k may be set to a fixed value (for example, $2^p-1$).

In an embodiment, assuming that the upper limit value corresponding to n is 6, and the specific bit time considered is 192BT, the corresponding back-off time may be illustrated in Table 1 below.

TABLE 1

| n | k | Back-off time (us) (19.2 us*k) |
|---|---|---|
| 1 | 1 | 19.2 |
| 2 | 3 | 57.6 |
| 3 | 7 | 134.4 |
| 4 | 15 | 288 |
| 5 | 31 | 595.2 |
| 6 | 63 | 1209.6 |
| 7 | 63 | 1209.6 |
| 8 | 63 | 1209.6 |
| 9 | 63 | 1209.6 |
| 10 | 63 | 1209.6 |
| 11 | 63 | 1209.6 |
| 12 | 63 | 1209.6 |
| 13 | 63 | 1209.6 |
| 14 | 63 | 1209.6 |

Next, in Step S260, the controller 104 determines the node identity for the PLCA device 10 in the PLCA network 100 based on the identification information table.

In an embodiment, the controller 104 may execute Step S260 after determining that the cumulative packet detection time is no longer less than the preset time threshold. Specifically, when the controller 104 determines that the cumulative packet detection time is no longer less than the preset time threshold, it means that no PLCA device sends its own synchronization packet due to a synchronization packet from an unfamiliar PLCA device. In other words, none of the PLCA devices 10 to 1N are unfamiliar with each other. In this case, the controller 104 may determine the node identity for the PLCA device 10 based on the maintained identification information table, but not limited thereto.

In an embodiment, the controller 104 sorts the identification information ID0 to IDN of the PLCA devices 10 to 1N in the maintained identification information table in a descending sequence or an ascending sequence, and decides the node identity of the PLCA device 10 in the PLCA network 100 according to the sequence of the identification information ID0 of the PLCA device 10 in the identification information table.

In an embodiment, the node identity of the PLCA device 10 is, for example, a node number, wherein the node number corresponds to the sequence of the identification information ID0 of the PLCA device 10 in the identification information table. For example, taking the descending sequence sorting as an example, if the sequence of the identification information ID0 of the PLCA device 10 in the identification information table is 9, the node number of the PLCA device 10 is, for example, 9, and the node number may be used as the node identity of the PLCA device 10. For another example, if the sequence of the identification information ID0 of the PLCA device 10 in the identification information table is 21, the node number of the PLCA device 10 is, for example, 21, and the node number may be used as the node identity of the PLCA device 10, but not limited thereto.

In addition, the other PLCA devices 11 to 1N may also decide their own node numbers and/or node identities based on the same principle.

From the above, it can be seen that the method provided by the embodiment of the disclosure allows the PLCA devices 10 to 1N in the PLCA network 100 to automatically determine the node identities in the PLCA network 100.

After determining the node identity of the PLCA device 10, the controller 104 may also determine the transmission opportunity (TO) of the PLCA device 10 in the PLCA network 100 accordingly.

In an embodiment, the transmission opportunity of the PLCA device 10 in the PLCA network 100 may correspond to the node number of the PLCA device 10. For example, if the node number of the PLCA device 10 is 9, the controller 104 may determine that the sequence of the PLCA device 10 for transmission is the 9th among the PLCA devices 10 to 1N. For another example, if the node number of the PLCA device 10 is 21, the controller 104 may determine that the sequence of the PLCA device 10 for transmission is the 21st among the PLCA devices 10 to 1N, but not limited thereto.

As mentioned earlier, after deciding the individual node identities of the PLCA devices 10 to 1N, the PLCA network 100 may then actually run the PLCA mechanism among the PLCA devices 10 to 1N accordingly.

In the PLCA mechanism, the PLCA devices 10 to 1N transmit according to the corresponding transmission opportunities. For example, assuming that the PLCA devices 10 to 1N respectively correspond to node numbers 0 to N, the PLCA devices 10 to 1N transmit in sequence. After the transmission opportunity of the PLCA device 1N ends, it will be the turn of the transmission opportunity of the PLCA device 10 again.

In an embodiment, the disclosure further proposes a method for allowing a new PLCA device to join the PLCA network 100 after running the PLCA mechanism. Specifically, for the newly added PLCA device (hereinafter referred to as a second PLCA device), the second PLCA device may send (for example, broadcast) a second synchronization packet including the second identification information to the PLCA network 100 after generating a random number as its own identification information (hereinafter referred to as second identification information).

In this case, the PLCA device 10 may determine a second comparison result between the identification information ID0 of the PLCA device 10 and the second identification information of the second PLCA device by the comparator 103 after the communication circuit 101 receives the second synchronization packet. Afterwards, the controller 104 may update the identification information table and the device count based on the second comparison result, and control the communication circuit 101 to send the synchronization packet PA0 corresponding to the PLCA device 10 based on the second comparison result.

In an embodiment, the second comparison result may, for example, specify that the identification information ID0 is the same as or different from the second identification information, but not limited thereto.

Similarly, other PLCA devices may also execute the above operations due to the second synchronization packet.

In a fourth embodiment, in response to determining that the second comparison result indicates that the identification information ID0 is different from the second identification information, and the second identification information is not recorded in the identification information table, it means that the second PLCA device is an unfamiliar PLCA device to the PLCA device 10. Based on this, the controller 104 may update the identification information table by resetting the identification information table, and update the device count by resetting the device count. After that, the controller 104 may control the communication circuit 101 to send the synchronization packet PA0 corresponding to the PLCA device 10.

In this case, the second PLCA device adds the identification information ID0 into the identification information table maintained by the second PLCA device due to the synchronization packet PA0 and increments the device count. Afterwards, the second PLCA device may re-send the second synchronization packet.

Similarly, the other PLCA devices 11 to 1N also individually reset the identification information tables, reset the device counts, and send the corresponding synchronization packets PA1 to PAN due to the second synchronization packet.

Since the identification information table and the device count of the PLCA device 10 have been reset, all other PLCA devices are unfamiliar to the PLCA device 10. Based on this, the PLCA device 10 continuously updates the identification information table and the device count due to the synchronization packets PA1 to PAN and the second synchronization packet. Similarly, the other PLCA devices 11 to 1N and the second PLCA device also continuously update the maintained identification information tables and device counts due to the synchronization packets PA1 to PAN and/or the second synchronization packet.

In this case, the identification information table maintained by the PLCA device 10 eventually records the identification information ID0 to IDN and the second identification information, and the recorded device count is equal to the total number of the PLCA devices 10 to 1N and the second PLCA device, but not limited thereto. Similarly, the identification information tables individually maintained by the other PLCA devices 11 to 1N and the second PLCA device also eventually record the identification information ID0 to IDN and the second identification information, and the recorded device counts are equal to the total number of the PLCA devices 10 to 1N and the second PLCA device.

Afterwards, the PLCA device 10 (and other PLCA devices in the PLCA network 100) may then decide their own node identities and/or node numbers according to the teachings of the previous embodiments, and run the PLCA mechanism again according to the corresponding transmission opportunities, but not limited thereto.

In a fifth embodiment, in response to determining that the second comparison result indicates that the identification information ID0 is the same as the second identification information, it means that the PLCA device 10 and the second PLCA device use duplicate identification information (that is, an identification information conflict occurs). In this case, the controller 104 updates the identification information table by resetting (for example, clearing) the identification information table, and updates the device count by resetting (for example, clearing) the device count.

Moreover, the controller 104 may (control the random number generator 102 to) generate another random number as the new identification information ID0 of the PLCA device, and control the communication circuit 101 to send the resynchronization packet RS and the synchronization packet PA0 corresponding to the PLCA device 10, wherein the synchronization packet PA0 includes the new identification information ID0 of the PLCA device 10.

From another point of view, when the PLCA device 10 determines that the PLCA device 10 and the second PLCA device use duplicate identification information, the PLCA device 10 may correspondingly execute the content of the third embodiment. For relevant details, reference may be made to the description of the third embodiment, which will not be repeated here.

In a sixth embodiment, in response to determining that a packet collision is detected when the PLCA device 10 executes the corresponding transmission opportunity, it means that an unknown PLCA device is sending a packet. Specifically, when any one of the PLCA devices 10 to 1N decides its own transmission opportunity, the transmission opportunities corresponding to other PLCA devices are also known at the same time. Therefore, if a certain PLCA device sends a packet when other PLCA devices execute the corresponding transmission opportunities, it means that the PLCA device is not an original member (that is, is a new PLCA device) in the PLCA network 100.

Therefore, when the PLCA device 10 detects a packet collision when executing the corresponding transmission opportunity, the controller 104 may correspondingly reset the identification information table, reset the device count, and generate another random number as the new identification information ID0 of the PLCA device 10. Afterwards, the controller 104 may control the communication circuit 101 to send the resynchronization packet RS and the synchronization packet PA0 corresponding to the PLCA device 10, wherein the synchronization packet PA0 includes the new identification information ID0 of the PLCA device.

From another point of view, when the PLCA device 10 determines that a packet collision is detected when executing the transmission opportunity, the PLCA device 10 may correspondingly execute the content of the third embodiment. For relevant details, reference may be made to the description of the third embodiment, which will not be repeated here.

In an embodiment, after the PLCA devices 10 to 1N decide their own node identities and/or node numbers, the PLCA devices 10 to 1N may also determine whether they are main nodes in the PLCA network 100 accordingly.

In the embodiment of the disclosure, a PLCA device with a specific node identity and/or a specific node number may be referred to as a main node. For ease of description, it is assumed that the PLCA device with the node number 0 is the main node in the PLCA network 100, but not limited thereto.

In a seventh embodiment, assuming that the PLCA device 10 is the main node, the controller 104 may determine whether there is a specific PLCA device among the other PLCA devices 11 to 1N, wherein the specific PLCA device does not execute any transmission operation in the corresponding transmission opportunity.

In response to determining that there is the PLCA device, it means that there is an idle PLCA device or a removed PLCA device not actually transmitting in the PLCA network 100. In this case, the controller 104 may reset the identification information table, reset the device count, and generate another random number as the new identification information ID0 of the PLCA device 10. Afterwards, the controller 104 may control the communication circuit 101 to send the resynchronization packet RS and the synchronization packet PA0 corresponding to the PLCA device 10, wherein the synchronization packet PA0 includes the new identification information ID0 of the PLCA device 10.

From another point of view, when the PLCA device 10 determines that there is the idle PLCA device or the removed PLCA device, the PLCA device 10 may correspondingly execute the content of the third embodiment. For relevant details, reference may be made to the description of the third embodiment, which will not be repeated here.

Figure 3:
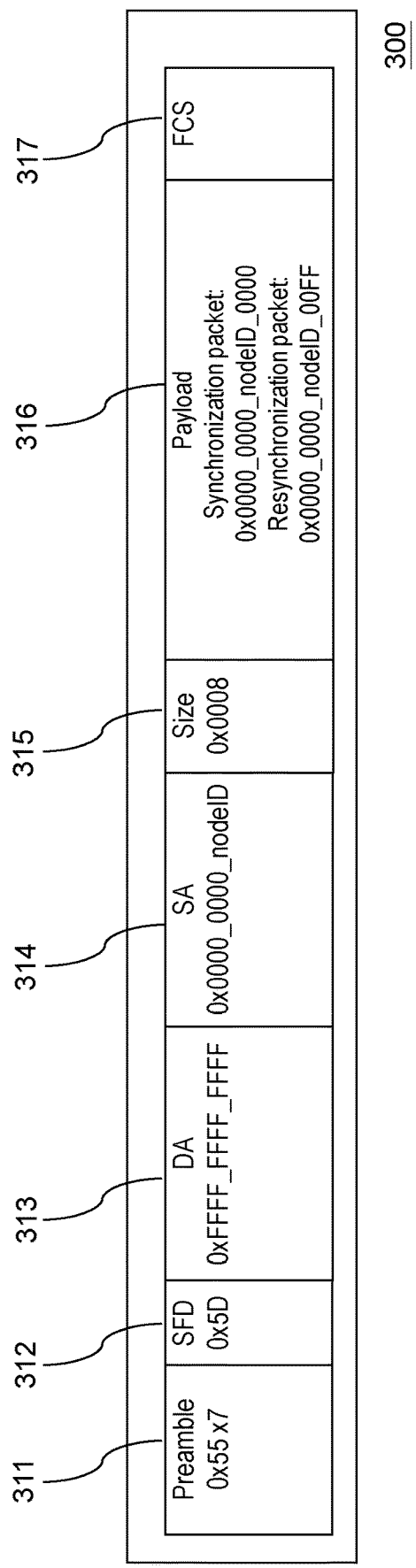
FIG. 3 is a schematic diagram of a packet format according to an embodiment of the disclosure.

Please refer to FIG. 3, which is a schematic diagram of a packet format according to an embodiment of the disclosure. In FIG. 3, a packet format 300 includes, for example, a preamble 311, a start of frame delimiter (SFD) 312, a destination address (DA) 313, a source address (SA) 314, a size 315, a payload 316, and a frame check sequence (FCS) 317.

In different embodiments, the synchronization packet and the resynchronization packet may both have the format shown in FIG. 3, but the difference between the synchronization packet and the resynchronization packet mainly lies in the content of the payload 316.

In an embodiment, when the packet format 300 is used to implement the synchronization packet, the content of the payload 316 is, for example, "0x0000_0000_nodeID_0000", wherein nodeID is, for example, the identification information of the PLCA device sending the synchronization packet. In addition, when the packet format 300 is used to implement the resynchronization packet, the content of the payload 316 is, for example, "0x0000_0000_nodeID_00FF", wherein nodeID is, for example, the identification information of the PLCA device sending the resynchronization packet.

In addition, the destination address 313 records, for example, the address of the PLCA device that should receive the synchronization packet and/or the resynchronization packet. In FIG. 3, when the destination address 313 is set to the form as shown, it may be understood as broadcasting the packet, but not limited thereto.

In addition, the source address 314 records, for example, the address of the PLCA device sending the synchronization packet and/or the resynchronization packet. In FIG. 3, the address of the PLCA device sending the synchronization packet and/or the resynchronization packet may be expressed as "0x0000_0000_nodeID", but not limited thereto.

In summary, the method of the embodiment of the disclosure may allow each PLCA device in the PLCA network to automatically decide the corresponding node identity before running the PLCA mechanism, so that the subsequent PLCA mechanism can smoothly performed accordingly. Moreover, the embodiment of the disclosure further proposes the mechanism for automatically re-deciding the node identity of each PLCA device due to the newly added PLCA device, the idle PLCA device, and/or the removed PLCA device after running the PLCA mechanism. In this way, it is possible to avoid incorrectly setting the node identity of each PLCA device and causing the PLCA mechanism to be unable to run correctly.

Although the disclosure is disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A physical layer collision avoidance device, comprising:
    a communication circuit, used to receive a first synchronization packet, wherein the first synchronization packet comprises first identification information of a first physical layer collision avoidance device;
    a controller, coupled to the communication circuit and maintaining an identification information table and a device count, wherein the controller is configured to:
        generate a random number as identification information of the physical layer collision avoidance device;
        determine a first comparison result between the identification information of the physical layer collision avoidance device and the first identification information of the first physical layer collision avoidance device;
        update the identification information table and the device count based on the first comparison result;
        control the communication circuit to send a synchronization packet corresponding to the physical layer collision avoidance device based on the first comparison result; and
        determine a node identity for the physical layer collision avoidance device in a physical layer collision avoidance network based on the identification information table.

2. The physical layer collision avoidance device according to claim 1, wherein the controller is configured to:
    in response to determining that the first comparison result indicates that the identification information of the physical layer collision avoidance device is different from the first identification information of the first physical layer collision avoidance device, determine whether the first identification information of the first physical layer collision avoidance device is recorded in the identification information table of the physical layer collision avoidance device; and in response to determining that the first identification information of the first physical layer collision avoidance device is not recorded in the identification information table of the first physical layer collision avoidance device, update the identification information table by adding the first identification information of the first physical layer collision avoidance device into the identification information table, and update the device count by incrementing the device count.

3. The physical layer collision avoidance device according to claim 2, wherein the controller is further configured to:
in response to determining that the first identification information of the first physical layer collision avoidance device is recorded in the identification information table of the physical layer collision avoidance device, reset a packet detection time of the physical layer collision avoidance device.

4. The physical layer collision avoidance device according to claim 2, wherein in response to determining that the first identification information of the first physical layer collision avoidance device is not recorded in the identification information table of the physical layer collision avoidance device, the controller is further configured to:
control the communication circuit to send the synchronization packet corresponding to the physical layer collision avoidance device, wherein the synchronization packet comprises the identification information of the physical layer collision avoidance device.

5. The physical layer collision avoidance device according to claim 1, wherein the controller is configured to:
in response to determining that the first comparison result indicates that the identification information of the physical layer collision avoidance device is the same as the first identification information of the first physical layer collision avoidance device, update the identification information table by resetting the identification information table, and update the device count by resetting the device count.

6. The physical layer collision avoidance device according to claim 1, wherein the controller is configured to:
in response to determining that the first comparison result indicates that the identification information of the physical layer collision avoidance device is the same as the first identification information of the first physical layer collision avoidance device, generate another random number as new identification information of the physical layer collision avoidance device; and
control the communication circuit to send a resynchronization packet and the synchronization packet corresponding to the physical layer collision avoidance device, wherein the synchronization packet comprises the new identification information of the physical layer collision avoidance device.

7. The physical layer collision avoidance device according to claim 6, wherein the resynchronization packet is at least used to trigger the first physical layer collision avoidance device to reset the corresponding identification information table, reset the corresponding device count, regenerate the corresponding first identification information, and send the first synchronization packet comprising the first identification information.

8. The physical layer collision avoidance device according to claim 1, wherein the controller is further configured to:
accumulate a packet detection time without receiving any synchronization packet; and
in response to determining that the packet detection time is not less than a preset time threshold, determine the node identity for the physical layer collision avoidance device in the physical layer collision avoidance network based on the identification information table.

9. The physical layer collision avoidance device according to claim 8, wherein the physical layer collision avoidance network at least comprises the physical layer collision avoidance device and at least one other physical layer collision avoidance device, the identification information table records the identification information of the physical layer collision avoidance device and identification information of each of the at least one other physical layer collision avoidance device, and the controller is configured to:
sort the identification information of the physical layer collision avoidance device and the identification information of each of the at least one other physical layer collision avoidance device in the identification information table in a descending sequence; and
determine the node identity for the physical layer collision avoidance device in the physical layer collision avoidance network according to a sequence of the identification information of the physical layer collision avoidance device in the identification information table.

10. The physical layer collision avoidance device according to claim 9, wherein the node identity of the physical layer collision avoidance device is a node number, wherein the node number corresponds to the sequence of the identification information of the physical layer collision avoidance device in the identification information table.

11. The physical layer collision avoidance device according to claim 1, wherein the controller is further configured to:
determine a transmission opportunity of the physical layer collision avoidance device in the physical layer collision avoidance network based on the node identity of the physical layer collision avoidance device in the physical layer collision avoidance network.

12. The physical layer collision avoidance device according to claim 11, wherein after determining the transmission opportunity of the physical layer collision avoidance device in the physical layer collision avoidance network, the controller is further configured to:
in response to determining that the communication circuit receives a second synchronization packet comprising second identification information of a second physical layer collision avoidance device, determine a second comparison result between the identification information of the physical layer collision avoidance device and the second identification information of the second physical layer collision avoidance device;
update the identification information table and the device count based on the second comparison result; and
control the communication circuit to send the synchronization packet corresponding to the physical layer collision avoidance device based on the second comparison result.

13. The physical layer collision avoidance device according to claim 12, wherein the controller is configured to:
in response to determining that the second comparison result indicates that the identification information of the physical layer collision avoidance device is different from the second identification information of the second physical layer collision avoidance device, and the second identification information is not recorded in the identification information table, update the identification information table by resetting the identification information table, and update the device count by resetting the device count; and control the communication circuit to send the synchronization packet corresponding to the physical layer collision avoidance device.

14. The physical layer collision avoidance device according to claim 12, wherein the controller is configured to:
in response to determining that the second comparison result indicates that the identification information of the physical layer collision avoidance device is the same as the second identification information of the second physical layer collision avoidance device, update the identification information table by resetting the identification information table, and update the device count by resetting the device count;
generate another random number as new identification information of the physical layer collision avoidance device; and
control the communication circuit to send a resynchronization packet and the synchronization packet corresponding to the physical layer collision avoidance device, wherein the synchronization packet comprises the new identification information of the physical layer collision avoidance device.

15. The physical layer collision avoidance device according to claim 11, wherein the controller is configured to:
in response to determining that a packet collision is detected when the physical layer collision avoidance device executes the corresponding transmission opportunity, reset the identification information table, reset the device count, and generate another random number as new identification information of the physical layer collision avoidance device; and
control the communication circuit to send a resynchronization packet and the synchronization packet corresponding to the physical layer collision avoidance device, wherein the synchronization packet comprises the new identification information of the physical layer collision avoidance device.

16. The physical layer collision avoidance device according to claim 11, wherein the physical layer collision avoidance network at least comprises the physical layer collision avoidance device and at least one other physical layer collision avoidance device, each of the at least one other physical layer collision avoidance device has a corresponding transmission opportunity, and the controller is configured to:
in response to determining that the node identity of the physical layer collision avoidance device indicates that the physical layer collision avoidance device is a main node in the physical layer collision avoidance network, determine whether there is a specific layer collision avoidance device in the at least one other physical layer collision avoidance device, wherein the specific physical layer collision avoidance device does not execute any transmission operation in the corresponding transmission opportunity;
in response to determining that there is the specific physical layer collision avoidance device, reset the identification information table, reset the device count, and generate another random number as new identification information of the physical layer collision avoidance device; and
control the communication circuit to send a resynchronization packet and the synchronization packet corresponding to the physical layer collision avoidance device, wherein the synchronization packet comprises the new identification information of the physical layer collision avoidance device.

17. The physical layer collision avoidance device according to claim 1, wherein the controller is configured to:
in response to determining that the synchronization packet experiences a packet collision, increment a cumulative number of collisions of the synchronization packet, and re-send the synchronization packet after waiting for a back-off time, wherein the back-off time is associated with the cumulative number of collisions.

18. The physical layer collision avoidance device according to claim 17, wherein the back-off time is characterized by D*k, where D is a specific bit time and k is $2^n-1$, where n is the cumulative number of collisions.

19. The physical layer collision avoidance device according to claim 1, further comprising:
a random number generator, used to generate the random number as the identification information of the physical layer collision avoidance device; and
a comparator, used to determine the first comparison result between the identification information of the physical layer collision avoidance device and the first identification information of the first physical layer collision avoidance device.

20. A method for automatically determining a node identity for a physical layer collision avoidance device, applicable to the physical layer collision avoidance device, comprising:
generating a random number as identification information of the physical layer collision avoidance device, wherein the physical layer collision avoidance device maintains an identification information table and a device count;
receiving a first synchronization packet, wherein the first synchronization packet comprises first identification information of a first physical layer collision avoidance device;
determining a first comparison result between the identification information of the physical layer collision avoidance device and the first identification information of the first physical layer collision avoidance device;
updating the identification information table and the device count based on the first comparison result;
controlling the communication circuit to send a synchronization packet corresponding to the physical layer collision avoidance device based on the first comparison result; and
determining the node identity for the physical layer collision avoidance device in a physical layer collision avoidance network based on the identification information table.

* * * * *